Patented Aug. 12, 1941

2,252,333

UNITED STATES PATENT OFFICE 2,252,333

PREPARATION OF SYNTHETIC DRYING OILS

Henry S. Rothrock, Wilmington, Del., assignor to E. I. du Pont de Nemours & Company, Wilmington, Del., a corporation of Delaware No Drawing. Application August 28, 1939, Serial No. 292,362

15 Claims. (Cl. 260—93)

This invention relates to the preparation of synthetic drying oils and has particular reference to the preparation of improved synthetic drying oils by the polymerization of aliphatic open-chain conjugated diolefinic hydrocarbons, such as butadiene and its homologs. More particularly the invention comprises a process for making synthetic drying oils by the polymerization of such aliphatic open-chain conjugated diolefinic hydrocarbons in the presence of an organic carbonyl compound and a copper salt of an organic or other weak acid and preferably also in the presence of an inert organic solvent.

Many attempts have been made to obtain synthetic products having the drying characteristics of certain naturally occurring oils. These naturally occurring oils, such as linseed oil, soya bean oil, oiticica oil, and China-wood oil, possess the property of forming relatively hard, adherent and insoluble films when exposed to air in thin layers at either ordinary or elevated temperatures. The process of these oil films becoming hard and insoluble is attributed to oxidation and polymerization, and is commonly referred to as drying.

Previous methods for obtaining polymers of drying nature from unsaturated hydrocarbons, such as butadiene and its homologs, have resulted in products having drying characteristics greatly inferior to the naturally occurring oils. In these prior efforts to obtain drying polymers, numerous catalysts have been tried, such as peroxides, oxygen, sodium, and other alkali metals, metallic halides, particularly of the amphoteric elements, and adsorbent agents, such as clay, bauxite and fuller's earth.

The polymers prepared with the use of such catalysts are very inferior with respect to rate of drying, hardness and toughness of the films formed as compared to films of the naturally occurring drying oils. Prior methods have not only produced unsatisfactory products but the yield of drying polymers have been extremely low. Efforts to use other substances as catalysts have resulted in the transformation of the butadiene into an insoluble rubbery polymer unsuitable for use as a drying oil.

This invention has as an object the provision of a method for obtaining improved synthetic drying oils by the polymerization of aliphatic open-chain conjugated diolefinic hydrocarbons, particularly butadiene and its homologs. A further object is to provide a method for transforming aliphatic open-chain conjugated diolefinic hydrocarbons into drying polymers having superior properties with respect to rates of drying and nature of films produced. A still further object is to provide a method for obtaining drying polymers from such aliphatic open-chain conjugated diolefins in good yields and without appreciable formation of insoluble, rubbery polymers. Other objects of the invention will appear hereinafter.

These objects are accomplished by subjecting an aliphatic open-chain conjugated diolefin, particularly butadiene, to the action of elevated temperatures and pressures in the presence of an organic carbonyl compound of the aldehyde and ketone group as a promoter and in the presence of a copper salt of an organic acid or other weak acid as a catalyst, and preferably also in the presence of a small proportion of a hydrocarbon as a solvent.

In the preferred embodiment of this invention, a hydrocarbon of the butadiene series, as butadiene, is polymerized at elevated temperatures and pressures in the presence of n-butyraldehyde as a promoter and in the presence of cupric acetate as a catalyst and also in the presence of benzene as a solvent. The catalyst employed in this invention is any copper salt of an organic acid or other weak acid, such as cupric acetate, cuprous acetate, copper chromite, and copper stearate.

While n-butyraldehyde is preferred for use as the promoter, any organic carbonyl compound of the aldehyde and ketone group may be used, such as acetaldehyde, crotonaldehyde, heptaldehyde, acetone, methacrolein, and methyl ethyl ketone. In order to obtain best results, the quantity of promoter employed should be approximately 3% of the quantity of butadiene or other aliphatic open-chain conjugated diolefinic hydrocarbon used. It is preferable to maintain the concentration of the promoter within the range from .3% to 6% of the quantity of butadiene used. Smaller quantities of the promoter lower the yield of drying polymer while larger quantities may promote the formation of insoluble, rubbery polymer.

The process of this invention is applicable to polymerize aliphatic open-chain conjugated diolefinic hydrocarbons, particularly butadiene and its various homologs, such as isoprene, methyl butadiene (piperylene) or 2,3-dimethyl butadiene. Such homologs, which are equivalents for butadiene in the present invention, are therefore comprehended within the meaning of the term a conjugated butadiene as used herein. The various aliphatic open-chain conjugated diolefinic hydrocarbons may be employed alone or in mixtures with butadiene or with each other.

The method of the present invention may also be employed to obtain drying oils by interpolymerization of butadiene and its homologs with various vinyl compounds, such as styrene, methyl methacrylate, vinyl chloride, vinyl acetate, and the like or with conjugated cyclic diolefins, such as cyclopentadiene and cyclohexadiene. Also indene and chloroprene may be interpolymerized with butadiene and its homologs by the use of this invention. The formation of products having good drying characteristics is favored by a relatively high ratio of butadiene to the vinyl component present in the interpolymerization mixture.

The inert organic solvent employed is preferably benzene, but may be various aromatic or aliphatic hydrocarbons; for example, gasoline, petroleum ether, toluene, and the like. Hydroxylated organic compounds such as alcohols, and phenols may also be used as solvents but generally do not produce drying oils having as good drying and film-forming properties as when benzene is employed. The highest conversions to drying polymer are obtained when a low proportion of solvent to butadiene is used, that is between 10% to 30% of solvent to butadiene. However, appreciable yields have been obtained with as high as a 3 to 1 ratio of solvent to butadiene.

The invention is illustrated by the following examples, in which parts are by weight unless otherwise specified.

Example I illustrates the use of copper acetate as a catalyst for the polymerization of butadiene to a drying polymer.

Example I

A steel pressure bomb is loaded with 80 parts butadiene, 17 parts benzene, 3 parts n-butyraldehyde, 12 parts of a catalyst mixture. This catalyst mixture consists of equal parts of iron powder (reduced by hydrogen), copper metal (precipitated powder), iron oxide (ferroso-ferric, of the formula $Fe_3O_4H_2O$) and copper acetate $Cu(C_2H_3O_2)_2 2H_2O$. The iron powder, copper powder and iron oxide serve as inert extenders and good yields of drying polymer can be obtained by omitting these ingredients and employing copper acetate alone as a catalyst.

The bomb is sealed, placed in a shaker rack, and heated for 5 hours at 160° C. The bomb is then cooled, the unreacted butadiene released, and the contents removed. The product is freed from solid material by filtration, and volatile material evaporated from the filtrate under vacuum.

There is obtained as a residue from the filtrate 24.8 parts of pale yellow, very viscous, oily polymer which has an iodine number of approximately 400, and is readily soluble in organic hydrocarbons, such as xylene, toluene, benzene, mineral spirits and the like. It forms hard, tough, adherent coatings of excellent durability and chemical resistance when thin films on a suitable support or backing are exposed at room temperature for a few hours, or for shorter periods of time at elevated temperatures. This drying is accelerated by the usual catalysts for the drying of oils, such as the naphthenates or oleates of lead, cobalt, or manganese.

Example II illustrates the use of cuprous acetate as a catalyst for the polymerization of butadiene in accordance with this invention. Since the cuprous acetate is not particularly stable, it is suitable to prepare it in the reaction medium as is illustrated in the following example.

Example II

A pressure bomb is loaded with 80 parts butadiene, 17 parts benzene, and 3 parts n-butyraldehyde, 2.1 parts cuprous oxide and 2.3 parts acetic acid. The bomb is sealed, placed in a shaker rack, and heated for 5 hours at 160° C. After cooling, the excess butadiene is released, the bomb opened, and the contents removed. The solid is filtered from the reaction product and the volatile material evaporated from the filtrate on a water bath under vacuum.

There is thus obtained 13.3 parts of pale yellow, viscous, oily, soluble polymer similar to that described under Example I.

Example III illustrates the use of copper chromite as a catalyst for the polymerization of butadiene to a drying polymer.

Example III

A steel pressure bomb is loaded with 90 parts butadiene, 19.5 parts benzene, 3 parts n-butyraldehyde, and 9 parts copper chromite. The bomb is sealed, placed in a shaker rack, and heated for 5 hours at 160° C. The unreacted butadiene is then released and the contents removed and treated by filtration and evaporation as described in Example I.

There is thus obtained 18 parts of product comprising the characteristics of the drying polymer described under Example I.

Example IV illustrates the use of copper stearate as a catalyst for the polymerization of butadiene to a drying polymer.

Example IV

A pressure bomb is loaded with 90 parts butadiene, 19.5 parts benzene, 3 parts n-butyraldehyde and 6 parts copper stearate. The bomb is sealed, placed in a shaker rack and heated for 5 hours at 160° C. The unreacted butadiene is released and the product removed and treated by filtration and evaporation as described in Example I.

There is obtained 26 parts of drying polymer having characteristics similar to those of the polymer obtained in Example I.

Example V illustrates the polymerization of a butadiene-butylene mixture by the process of this invention.

Example V

A pressure bomb is loaded with 50 parts butadiene, 50 parts butylene (a commercial 4-carbon olefin mixture containing 25% butadiene), 25 parts benzene, 2 parts n-butyraldehyde and 8 parts of the catalyst mixture, the composition of which is given in Example I. The bomb is sealed, placed in a shaker rack, and heated for 5 hours at 160° C. After cooling, unreacted butadiene and other gaseous olefins are released, the contents of the bomb removed and solid materials filtered off from the products.

Evaporation of the volatile materials from the filtrate on a water bath under vacuum leaves as residue 10 parts of a viscous, oily, soluble polymer similar to that described under Example I.

Example VI illustrates an interpolymerization between butadiene and styrene effected by employment of the process of this invention.

Example VI

A pressure bomb is loaded with 60 parts butadiene, 30 parts styrene, 25 parts benzene, 2 parts n-butyraldehyde and 8 parts of the catalyst mixture described under Example I. The bomb is sealed, placed in a shaker rack, and heated for 5 hours at 160° C.

When the reaction product from this run is removed and treated by filtration and evaporation as described in the preceding examples, there are obtained 24 parts of a viscous, soluble, oily product similar in appearance and drying properties to the soluble, oily polymer obtained as described under Example I.

Example VII illustrates an interpolymerization between butadiene and methyl methacrylate monomer effected by the employment of the process of this invention.

Example VII

When a mixture containing 50 parts butadiene, 30 parts methyl methacrylate monomer, 20 parts benzene, 2 parts n-butyraldehyde, and 8 parts of the catalyst mixture as described in Example I, is heated in a pressure bomb with shaking for 5 hours at 160° C., there is obtained a yield of 35 parts of a product having similar drying properties and appearance to the viscous, oily, soluble polymer described under Example I.

Another viscous, oily, soluble product showing excellent drying and film-forming properties may be obtained by heating under similar conditions the above mixture in which the methyl methacrylate monomer is replaced by indene or chloroprene.

The practice of the invention is not limited to the specific conditions of time, temperature and pressure set forth in the above examples. Periods of heating which are considerably less than, or considerably more than, 5 hours may be used.

Appreciable yields of drying polymer may be obtained when the reaction is carried out in the range from 140° C. to 200° C. In general, lower temperatures will require a longer period of heating, while a higher temperature will reduce the time of heating. In most cases, a temperature of about 160° C. gives optimum results.

The polymerization process may be conveniently conducted at the pressure developed by the reaction mixture under the temperature conditions employed. This pressure will ordinarily fall within the range of 300 to 600 pounds per square inch and may gradually decrease as the polymerization proceeds. While higher pressures may be used, extremely high pressures, as 2000 pounds per square inch, decrease the yields of drying polymer.

In this invention the use of both catalyst and promoter is essential, as the absence of either catalyst or promoter transforms butadiene into insoluble, rubbery polymer. Although the use of a promoter is essential, compounds may be used which are readily hydrolyzed or isomerized to an aldehyde or ketone, such as diethyl butyral, methallyl alcohol or aceto acetic ester.

As in the process of this invention the polymerization of the diolefin used is ordinarily incomplete, considerable quantities of unreacted butadiene may be recovered by collecting the gaseous material present at the end of the reaction. This gaseous material may be employed directly for the preparation of further quantities of drying polymer or it may first be purified by distillation or other treatment. This recovery and re-use of unreacted butadiene or other diolefin may be readily performed by carrying out the polymerization by a continuous process. In this continuous process, a portion of the solution containing the drying oil is continuously or intermittently withdrawn from the polymerization reaction, the drying oil is separated from the solution withdrawn, and unreacted butadiene is returned to the reaction for polymerization. Additional butadiene may be continuously or intermittently introduced into the polymerization reaction with the unreacted butadiene returned thereto.

The crude reaction product from the polymerization reaction is generally adequately purified by filtering, preferably through an adsorbent agent, such as kieselguhr filter-aid. Should the viscosity of the reaction product be too high to permit ready filtration, it may be diluted with additional solvent. Evaporation of the volatile material from the filtrate on a boiling water or steam bath under vacuum yields the non-volatile viscous polymer as a residue. This residue may be then dissolved in appropriate solvent to give a solution of the desired concentration or viscosity.

In some instances, particularly when an especially light-colored or more rapid drying product is desired, it may be desirable to treat the filtrate from the crude reaction mixture with a decolorizing agent such as absorbent charcoal. This may be accomplished by heating this filtrate for 30 minutes to 1 hour at 85° to 100° C. with stirring in the presence of a quantity of activated carbon equal in weight to 5 to 15% of the drying polymer present in the solution.

Any butadiene which may be transformed in the polymerization reaction into its dimer, vinyl cyclohexene, may be recovered by collection and re-distillation of the volatile material present in the reaction mixture. Such dimer, although not suitable as a drying oil, may be utilized as a solvent for varnishes, lacquers, and the like, or may be used as a raw material for the synthesis of other valuable chemicals.

The drying polymers prepared from butadiene or other aliphatic open-chain conjugated diolefin by the method of this invention may be utilized for the various decorative and protective purposes for which vehicles of a drying nature, such as the naturally occurring oils, are commonly employed. A solution of the drying polymer may be employed directly as a clear varnish or lacquer. For example, steel panels may be brushed or sprayed in the customary manner with a solution of the polymer in an appropriate hydrocarbon solvent such as xylene or mineral spirits. Such films show good drying characteristics, and dry rapidly at ordinary or elevated temperatures. Even more rapid drying is effected by the addition of a small amount (.1% to .3% by weight based on polymer present) of the customary drying accelerator, such as naphthenates or oleates of cobalt, lead or manganese. The coatings obtained are smooth, glossy, clear, colorless, hard, and adherent. They show no indications of cracking or loss of adhesion when the metal support is bent, and are remarkably resistant to the action of acids, alkalies, and of water or of other solvents. The coatings possess good durability characteristics on outdoor exposure. Solutions of the drying polymer in suitable solvents may be applied to other surfaces such as wood, or over base coats. Such coatings possess excellent gloss, adhesion and durability.

Solutions of the drying polymer are particularly suitable for uses which involve baking at relatively high temperatures, around 200° C. for instance. Drying is very rapid under these conditions, and hard, chemically resistant coatings which possess considerable flexibility are formed. Solutions of the drying polymer are thus especially suitable for coating the interior of food cans, beverage containers and the like.

Solutions of the drying polymer may also be used as vehicles for the preparation of enamels. For example, 100 parts of a 58% solution of the drying polymer from butadiene in mineral spirits is ground with 75 parts of titanium dioxide to produce an enamel of excellent whiteness and hiding power. This enamel coating may be air dried or baked, yielding a smooth, glossy coating of desirable appearance and durability. A black enamel having similar desirable properties is prepared by grinding together 100 parts of the drying oil polymer solution and 7 parts of carbon black.

Polymers prepared according to the method of the present invention are rapid drying and yield light colored, hard, tough films in contrast to those produced by prior methods which are generally slow drying, discolored, weak and in most cases brittle when completely dried. The use of the present invention is further advantageous in giving good yields of drying polymer and in preventing to a large extent the formation of insoluble rubbery polymers which are formed in prior methods. Another advantage of this invention is the relatively short period of time required for the polymerization reaction and the substantially continuous production of the drying polymer with return of unreacted products to the polymerization reaction.

As many apparently widely different embodiments of this invention may be made without departing from the spirit and scope thereof, it is to be understood that I do not limit myself to the specific embodiments thereof, except as defined in the appended claims.

I claim:

1. A process for making synthetic drying oils which comprises subjecting aliphatic open-chain conjugated diolefinic hydrocarbons to a polymerizing temperature under pressure in the presence of an organic carbonyl compound selected from the group consisting of the aldehydes and ketones and in the presence of a copper salt of weak acid.

2. A process for making synthetic drying oils which comprises subjecting aliphatic open-chain conjugated diolefinic hydrocarbons to a polymerizing temperature under pressure in the presence of n-butyraldehyde and in the presence of copper acetate.

3. A process for making synthetic drying oils which comprises subjecting a conjugated butadiene to a polymerizing temperature under pressure in the presence of an organic carbonyl compound selected from the group consisting of the aldehydes and ketones and in the presence of a copper salt of a weak acid.

4. The process set forth in claim 3 in which said organic carbonyl compound is n-butyraldehyde.

5. The process set forth in claim 3 in which said copper salt is copper acetate.

6. A process for making synthetic drying oils which comprises subjecting a conjugated butadiene to a polymerizing temperature under pressure in the presence of n-butyraldehyde and in the presence of copper acetate.

7. A process for making synthetic drying oils which comprises subjecting aliphatic open-chain conjugated diolefinic hydrocarbons to a polymerizing temperature under pressure in the presence of an organic carbonyl compound selected from the group consisting of the aldehydes and ketones in an amount approximating .3% to 6% by weight of said conjugated diolefinic hydrocarbons and in the presence of a copper salt of a weak acid.

8. The process set forth in claim 7 in which said organic carbonyl compound is n-butyraldehyde.

9. The process set forth in claim 7 in which said copper salt is copper acetate.

10. A process for making synthetic drying oils which comprises subjecting a conjugated butadiene to a polymerizing temperature under pressure in the presence of an organic carbonyl compound selected from the group consisting of the aldehydes and ketones in an amount approximating .3% to 6% by weight of said butadiene and in the presence of a copper salt of a weak acid.

11. The process set forth in claim 10 in which said organic carbonyl compound is n-butyraldehyde.

12. The process set forth in claim 10 in which said copper salt is copper acetate.

13. A process for making synthetic drying oils from hydrocarbon mixtures containing a conjugated butadiene which comprises subjecting said mixtures to a polymerizing temperature under pressure in the presence of an organic carbonyl compound selected from the group consisting of the aldehydes and ketones in an amount approximating .3% to 6% by weight of said butadiene and in the presence of a copper salt of a weak acid.

14. A process for making synthetic drying oils which comprises subjecting a conjugated butadiene and a vinyl compound to a polymerizing temperature under pressure in the presence of an organic carbonyl compound selected from the group consisting of the aldehydes and ketones in an amount approximating .3% to 6% by weight of said butadiene and in the presence of a copper salt of a weak acid.

15. A continuous process for making synthetic drying oils which comprises subjecting a conjugated butadiene in an inert organic solvent to a polymerizing reaction in the presence of an organic carbonyl compound selected from the group consisting of the aldehydes and ketones and in the presence of a copper salt of a weak acid, withdrawing during said process a portion of said solvent, separating therefrom synthetic drying oils and unreacted butadiene, and returning during said process said unreacted butadiene to said polymerization reaction for further treatment therein.

HENRY S. ROTHROCK.